US012717843B2

(12) United States Patent
Jin et al.

(10) Patent No.: US 12,717,843 B2
(45) Date of Patent: Aug. 25, 2026

(54) MEASURING FAIRNESS IN LARGE-SCALE RECOMMENDATION SYSTEMS WITH MISSING LABELS

(71) Applicant: Lemon Inc., Grand Caymon (KY)

(72) Inventors: Kun Jin, Culver City, CA (US); Yulong Dong, Los Angeles, CA (US); Xinghai Hu, Culver City, CA (US)

( * ) Notice: Subject to any disclaimer, the term of this patent is extended or adjusted under 35 U.S.C. 154(b) by 0 days.

(21) Appl. No.: 19/054,473

(22) Filed: Feb. 14, 2025

(65) Prior Publication Data

US 2025/0322014 A1 Oct. 16, 2025

Related U.S. Application Data

(60) Provisional application No. 63/633,991, filed on Apr. 15, 2024.

(51) Int. Cl.
*G06F 16/738* (2019.01)

(52) U.S. Cl.
CPC .................................. *G06F 16/738* (2019.01)

(58) Field of Classification Search
None
See application file for complete search history.

(56) References Cited

U.S. PATENT DOCUMENTS

2015/0032751 A1* 1/2015 Ting ...................... G06F 16/285 707/738
2025/0078091 A1* 3/2025 Munguia Tapia ..... G06N 20/00

FOREIGN PATENT DOCUMENTS

CN 114064748 A 2/2022

OTHER PUBLICATIONS

Chen et al., "Bias and Debias in Recommender System: A Survey and Future Directions," CoRR, submitted on Dec. 2021, arXiv:2010.03240v2, 38 pages.
Gao et al., "KuaiRand: An Unbiased Sequential Recommendation Dataset with Randomly Exposed Videos," CoRR, submitted on Aug. 2022, arXiv:2208.08696v2, 6 pages.
International Search Report in International Appln. No. PCT/SG2025/050256, mailed on Jul. 17, 2025, 3 pages.

* cited by examiner

*Primary Examiner* — Richard L Bowen
(74) *Attorney, Agent, or Firm* — Fish & Richardson P.C.

(57) ABSTRACT

Example computer-implemented methods and systems for fairness metric estimation are disclosed. One example method includes, for each user of multiple users, obtaining first data associated with a first collection of items, the first collection of items being recommended to the user by a recommendation model. Second data associated with a second collection of items recommended to the user is obtained, the second collection of items being randomly selected for recommendation to the user. A fairness metric is calculated as a calculated fairness metric and based on the first data and the second data.

17 Claims, 9 Drawing Sheets

Algorithm 1 Computing fairness metrics, their standard errors and confidence intervals

Input: Default traffic $\mathcal{D}_{rand}$ and random traffic $\mathcal{D}_{rand}$ with $Y, S$, and confidence level $1 - \delta$.
Compute sample means $\hat{P}_k = \mathbb{P}(Y(u,i) = 1, S(i) = s_k)$ on $\mathcal{D}_{rand}$.
Compute sample means $\hat{Q}_k = \mathbb{P}(Y(u,i) = 1, S(i) = s_k | R(u,i) = 1)$ on $\mathcal{D}_{rec}$.
Compute the group utility estimators $\hat{U}_k = \hat{Q}_k / \hat{P}_k$ of each group $k = 1, \cdots, K$.
Compute the REO penalty estimator $\widehat{\Delta_{\mathrm{REO}}}$ from $\{\hat{U}_k\}_{k=1}^{K}$.
Compute the relative group utility function $\widehat{\Delta U}_k$ of each group $k = 1, \cdots, K$.
//Detiving confidence intervals Assemble a K-by-K diagonal matrix $\Gamma_{k,k} = \hat{U}_k^2 \left( \frac{1-\hat{Q}_k}{\hat{Q}_k} \frac{1}{|\mathcal{D}_{rec}|} + \frac{1-\hat{P}_k}{\hat{P}_k} \frac{1}{|\mathcal{D}_{rand}|} \right)$. // variance of modified group utility functions Assemble a K-by-K matrix $G_{j,k} = K \frac{\delta_{j,k} \sum_{t=1}^{K} \hat{U}_t - \hat{U}_k}{(\sum_{t=1}^{K} \hat{U}_t)^2}$ // Jacobian matrix of the transformation $(U_1, \cdots, U_K) \mapsto (\Delta U_1, \cdots, \Delta U_K)$ Assemble a K-dimensional vector $H_j = \frac{\widehat{\Delta U}_j}{K \Delta_{\mathrm{REO}}}$. // Gradient of the transformation $(\Delta U_1, \cdots, \Delta U_K) \mapsto \Delta_{\mathrm{REO}}$
Set se $(\widehat{\Delta_{\mathrm{REO}}}) \leftarrow \mathrm{std}(\widehat{\Delta_{\mathrm{REO}}}(\cdot))$.

Compute the covariance matrix $[\mathrm{Cov}(\widehat{\Delta U}_j, \widehat{\Delta U}_k)]_{j,k} = \Sigma = G^\top \Gamma G$, and the variance $\mathrm{Var}(\widehat{\widehat{\Delta_{\mathrm{REO}}}}) = \Xi = H^\top \Sigma H$.

Set $z(\delta/2)$ to the upper quantile of the standard normal distribution.
for $k = 1, \cdots, K$ do For $\Delta U_k$, set the standard error $\mathrm{SE}(\widehat{\Delta U}_k) = \sqrt{\Sigma_{k,k}}$ and the confidence interval $\widehat{\Delta U}_k \pm z(\delta/2)\mathrm{SE}(\widehat{\Delta U}_k)$.
end for

For $\Delta_{\mathrm{REO}}$, set the standard error $\mathrm{SE}(\widehat{\Delta_{\mathrm{REO}}}) = \sqrt{\Xi}$ and the confidence interval $\widehat{\Delta_{\mathrm{REO}}} \pm z(\delta/2)\mathrm{SE}(\widehat{\Delta_{\mathrm{REO}}})$.
Output: Estimators, standard errors, and confidence intervals.

Algorithm 2 Partition-based A/B tests for REO metrics

Input: Confidence level 1 - δ, partition fold numbers $M_C, M_T$, dataset $(\mathcal{D}_{rec}^T, \mathcal{D}_{rec}^C, \mathcal{D}_{rand})$.
Initialize arrays $v_C \in \mathbb{R}^{M_C}$ and $v_T \in \mathbb{R}^{M_T}$.
Partition the original dataset into non overlapped subsets $\{(\mathcal{D}_{rec}^C(j), \mathcal{D}_{rand}^C(j)) : j \in [M_C]\}$ and $\{(\mathcal{D}_{rec}^T(j), \mathcal{D}_{rand}^T(j)) : j \in [M_T]\}$.
for $j = 1, \ldots, M_C$ do
  Estimate REO metric $v_C(j) \leftarrow \widehat{\Delta_{\text{REO}}}(j)$ on the $j$-th subset $(\mathcal{D}_{rec}^C(j), \mathcal{D}_{rand}^C(j))$.
end for
for $j = 1, \ldots, M_T$ do
  Estimate REO metric $v_T(j) \leftarrow \widehat{\Delta_{\text{REO}}}(j)$ on the $j$-th subset $(\mathcal{D}_{rec}^T(j), \mathcal{D}_{rand}^T(j))$.
end for
Set $\mu_C = \text{mean}(v_C), s_C = \text{std}(v_C)$ and $\mu_T = \text{mean}(v_T), s_T = \text{std}(v_T)$.
Output: Estimation $D_{\text{REO}} \approx \mu_T - \mu_C$ and confidence interval derived according to Equation (12).

Algorithm 3 Bootstrap-based A/B tests for REO metrics

Input: Confidence level 1 - δ, bootstrap size parameter B, dataset $(\mathcal{D}_{rec}^{T}, \mathcal{D}_{rec}^{C}, \mathcal{D}_{rand})$.
Initialize an array $v \in \mathbb{R}^{B}$.
Estimate $\widehat{D_{\mathrm{REO}}}$ from the original dataset.
for $j = 1, \ldots, B$ do
    Sample bootstrap dataset $(\mathcal{D}_{rec}^{T}(j), \mathcal{D}_{rec}^{C}(j), \mathcal{D}_{rand}(j))$ from the original dataset.
    Estimate difference-in-REO metric $v(j) \leftarrow \widehat{D_{\mathrm{REO}}}(j)$ on the $j$-th bootstrap dataset.
end for
Set $\mathrm{se}(\widehat{D_{\mathrm{REQ}}}) \leftarrow \mathrm{std}(\widehat{D_{\mathrm{REO}}}(\cdot))$.
Output: Estimation $D_{\mathrm{REQ}}$ and confidence interval derived according to Equation (13).

Algorithm 4 Testing fairness metrics in A/B experiments

Input: Default traffic $D_{rec}^{C}$ of control group, default traffic $D_{rec}^{T}$ of treatment group and random traffic $\mathcal{D}_{rand}$ with fields preference label Y and sensitive attribute S, confidence level 1 - δ.
Compute estimators $\widehat{\Delta_{\text{REO}}^{C}}, \widehat{\Delta U_k^{C}}, k = 1, \cdots, K$ and their standard errors using $D_{rec}^{C}, \mathcal{D}_{rand}$ and Algorithm 1.
Compute estimators $\widehat{\Delta_{\text{REO}}^{T}}, \widehat{\Delta U_k^{T}}, k = 1, \cdots, K$ and their standard errors using $D_{rec}^{C}, \mathcal{D}_{rand}$ and Algorithm 1.
Set $z(\delta/2)$ to the upper quantile of the standard normal distribution.
for $k = 1, \ldots, K$ do Set $\widehat{D_k} = \widehat{\Delta U_k^{T}} - \widehat{\Delta U_k^{C}}$, set the standard error $\text{SE}(\widehat{D_k}) = \sqrt{\text{SE}^2(\widehat{\Delta U_k^{T}}) + \text{SE}^2(\widehat{\Delta U_k^{C}})}$ and the confidence interval $\widehat{D_k} \pm z(\delta/2)\text{SE}(\widehat{D_k})$.

end for

Set $\widehat{D_{\text{REO}}} = \widehat{\Delta_{\text{REO}}^{T}} - \widehat{\Delta_{\text{REO}}^{C}}$, set the standard error $\text{SE}(\widehat{D_{\text{REO}}}) = \sqrt{\text{SE}^2(\widehat{\Delta_{\text{REO}}^{T}}) + \text{SE}^2(\widehat{\Delta_{\text{REO}}^{C}})}$ and the confidence interval $\widehat{D_{\text{REO}}} \pm z(\delta/2)\text{SE}(\widehat{D_{\text{REO}}})$.

Output: Estimators, standard errors, and confidence intervals.

MEASURING FAIRNESS IN LARGE-SCALE RECOMMENDATION SYSTEMS WITH MISSING LABELS

CROSS-REFERENCE TO RELATED APPLICATIONS

This application claims the benefit of U.S. provisional application No. 63/633,991, filed on Apr. 15, 2024, the disclosure of the aforementioned application is hereby incorporated by reference in its entirety.

BACKGROUND

This specification relates generally to evaluating the fairness in recommendation systems. Large scale recommendation systems often rely on datasets having a large number of data pairs without labels. In other words, only a subset of the potential data items has an assigned ground truth. Typically, data pairs with missing labels are treated as negative samples and discarded in computation, which can introduce bias in recommendation results or make less efficient use of the system and dataset.

SUMMARY

This specification is generally directed to computer-implemented methods and systems for using a portion of random traffic, which may include unlabeled user-item pairs, to generate a measure of fairness in large-scale recommendations systems. One example method includes, for each user of multiple users, obtaining first data associated with a first collection of items, the first collection of items being recommended to the user by a recommendation model. Second data associated with a second collection of items recommended to the user is obtained, the second collection of items being randomly selected for recommendation to the user. A fairness metric is calculated as a calculated fairness metric and based on the first data and the second data.

The previously described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, the first data includes a first collection of user-item pairs and an associated label indicating a user's interest in a recommended item, and the second data includes a second collection of user-item pairs and an associated label indicating the user's interest in the second collection of items.

In some implementations, the recommendation model employs one or more recommendation strategies that predict items of interest to the user.

In some implementations, the first collection of items and the second collection of items are delivered to the user, and the second collection of items are intermingled with the first collection of items for delivery to a user device.

In some implementations, the first collection of items and the second collection of items are short-form videos, and delivering the first and second collections of items to the user includes providing at least a portion of video content of each item to a user device for including in a video feed.

In some implementations, calculating the fairness metric includes dividing the multiple users into a number of distinct groups, each group having one or more users, calculating a utility metric for each group based on the first data and the second data corresponding to users of the group, and generating the fairness metric from the utility metric for each group.

In some implementations, the fairness metric is a Ranking-based Equal Opportunity (REO) fairness penalty.

In some implementations, a relative group utility is calculated to determine fairness differences between groups of users.

In some implementations, the second collection of items represent unlabeled user-item pairs.

In some implementations, in response to the first collection of items and the second collection of items containing a same recommended item, only a single version of the item is delivered to a user device, while data associated with a user-item pair is added to both the first data and the second data.

In some implementations, a randomly selected item corresponds to an item that was recommended by the recommendation model in response to an earlier user request, and in response, not including the item for delivery to the user and adding data of a user-item pair from the earlier user request to the second collection of data.

In some implementations, a fraction of total recommended items being randomly selected items is determined to balance a user's overall utility with an accuracy of the calculated fairness metric.

In some implementations, the recommendation model is a machine learning model trained to generate predictions of video content of interest to a target user.

In some implementations, a second recommendation model is based on one or more proposed recommendation strategies, and differences in fairness metrics between the recommendation model and the second recommendation model are evaluated.

In some implementations, the recommendation model is part of a social media platform, the multiple users are associated with accounts on the social media platform, and the first collection of items and the second collection of items are generated by individual users and provided to the social media platform for distribution.

In some implementations, in response to the fairness metric indicating that fairness fails to satisfy a particular threshold value, one or more recommendation strategies are modified.

The subject matter described in this specification can be implemented in particular embodiments so as to realize one or more of the following advantages. The techniques described in this specification allow for more accurate estimation of fairness metrics in large-scale recommendation systems to overcome problems associated with missing labels. Furthermore, the disclosed techniques can build a more efficient and simplified statistical test for performing A/B tests. In contrast to other non-parametric methods like permutation tests, the disclosed techniques can lead to gains in both space and time resource requirements of a recommendation system.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

FIG. 4 illustrates an example of an algorithm for determining confidence intervals of estimators of fairness metrics.

FIG. 5 illustrates an example of an algorithm for partition-based A/B tests for REO fairness metrics.

FIG. 6 illustrates an example of an algorithm for bootstrap-based A/B tests for REO fairness metrics.

FIG. 7 illustrates an example of an algorithm for significance tests for treatment effects in A/B tests.

Like reference numbers and designations in the various drawings indicate like elements.

DETAILED DESCRIPTION

Figure 1:
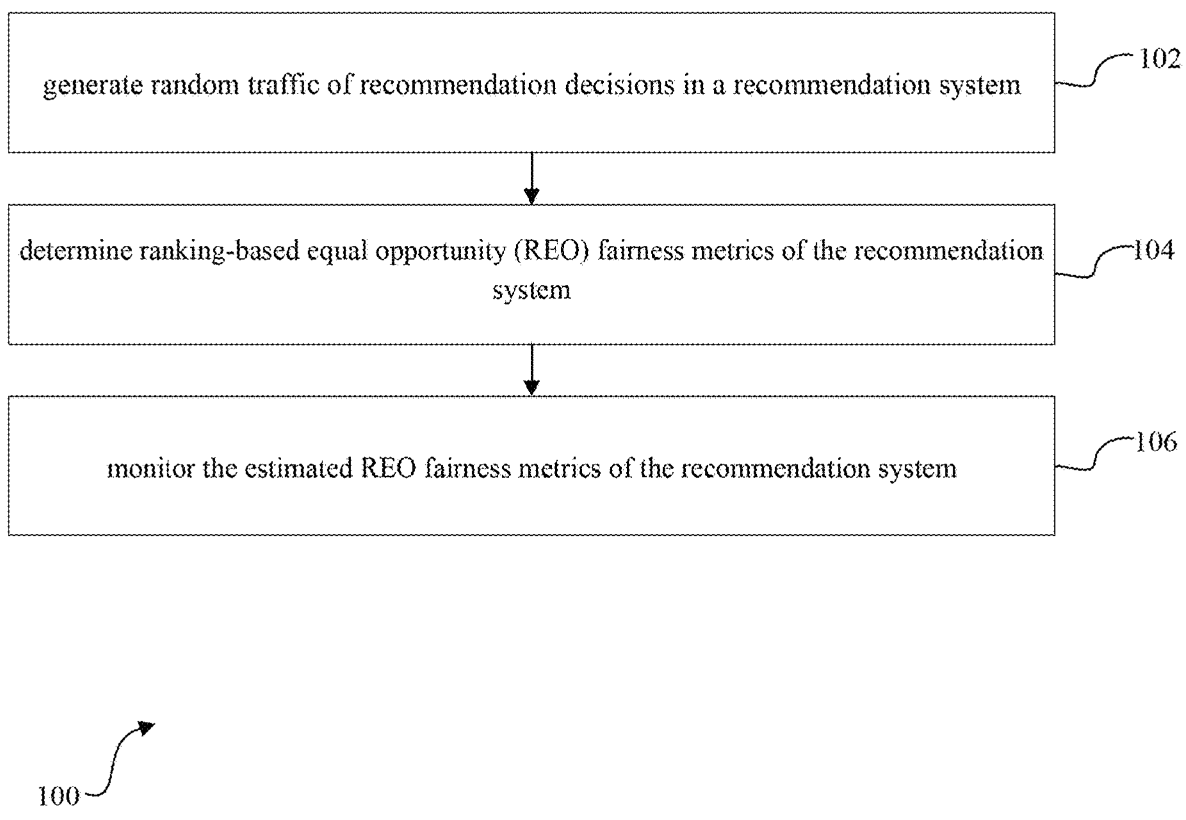
FIG. 1 illustrates an example process of estimating fairness metrics of a recommendation system using random traffic.

This specification describes technologies for using a portion of random traffic, which may include unlabeled user-item pairs, to generate a measure of fairness in large-scale recommendations systems. In some implementations, large-scale recommendation systems are used in many fields to provide recommendations. For example, the recommendation system can be configured to recommend particular items to users. The recommendation system can identify items likely to be of interest to the user or that is responsive to a query from the user. The items can be different types of content, for example, videos, music, and restaurants. For a social media platform, the recommended items can be provided to users of the platform, e.g., as part of a feed or stream of items.

In some implementations, a social media platform provides video content to users of the platform, for example, as part of a feed of videos presented in a user interface of a user device. The videos can be provided to the social media platform by other users (e.g., content creators).

For example, a content creator associated with a particular user device can provide a video to the platform. Video content can also be delivered to user devices by the platform. The user devices can be any Internet-connected computing device, e.g., a laptop or desktop computer, a smartphone, or an electronic tablet. The user device can be connected to the Internet through a mobile network, through an Internet service provider (ISP), or otherwise.

Each user device is configured with software, which will be referred to as a client or as client software that in operation can access the platform so that a user can interact with the platform. For example, the content creator can use the client software to upload video content to the platform as well as receive videos from the platform. The client software can be a platform specific application installed on the user device.

In some implementations, the client software provides a user interface for interacting with the platform. The user interface can include receiving data from the platform for presenting a feed of videos that the user can interact with. For example, the user can scroll up or down to switch between videos in the feed as well as interact with individual videos, e.g., by posting comments about the video, sharing the video, or expressing approval, e.g., liking the video.

In some implementations, the video content provided by the platform to user devices are short form videos. Short form videos are videos that are typically less than 90 seconds in length. In some implementations, short form videos have lengths of between 15 and 90 seconds. By contrast, long-form videos typically have lengths of at least 3 minutes.

In the example, a user device obtains or creates a video. The user device can be a mobile device that generates the video using a camera of the mobile device. The user of the user device can use the client software to upload the video to the platform, for example, to make the video content available for distribution to other users of the platform.

The platform processes videos received from the user device or otherwise obtained. The video processing can include various operations including encoding, transcoding, and labeling (e.g., categorizing) the video. The video content is then stored in video storage for potential delivery to user devices. For example, the platform can add the video (or an identifier of the video) to a candidate pool of videos. In some implementations, the video storage may be a distributed storage among multiple storage devices. Further, the video storage may, in some implementations, be replicated in multiple locations, such that multiple copies of the versions are stored, e.g., in multiple datacenters.

In response to a triggering event, the platform determines one or more items to provide to a user. The triggering event can be, for example, a user execution of software on a user device that initiates a session with the platform. For example, a user opening an application associated with the platform on a user device can be the trigger event for providing a set of items to the user. The trigger event can also be a response to user interaction. For example, a user interface can be presented to the user, e.g., in the user application executing on the user device, that includes a feed of content items. A user having scrolled through a specified number of content items in the feed can be a trigger to fetch a new set of items to deliver to the user device.

To determine the one or more items to provide to the user, the platform can employ a recommendation system that recommends one or more items to the user from a large collection of candidate items. The recommendation system can be, for example, a machine learning model that predicts items likely to be of interest to the user based, for example, on historical activities of the user as well as the trained model parameters.

The historical activities of the user can include user interactions with content items presented in the user interface on the user device. The interactions can be specific indications of interest, for example, by directly liking the content item. In some implementations, other types of interactions can be used as signals that, when taken in combination, can provide an overall judgment of interests or disinterest in the content items by the user. For example, a duration spent viewing the video can be a signal that can be used to infer interest or disinterest.

Large social media platforms receive large numbers of content items that may be added to the candidate pool. However, a given individual user will only receive a small number of the potential content items as actual recommendations. Furthermore, a given user may only interact with a subset of the content items sufficient enough to determine a ground truth value indicating the user interest in particular items. This means for most content items on the platform, no label exists for a given user-item pair. A "label" for the user-item pair means the user's preference to the item, e.g., the item is of interest to the user or the item is not of interest to the user. The label can be approximated based on proxy information, for example, the user's interaction with the item, as described above.

This application is directed to a system that is configured to determine a measure of fairness for a recommendation system, as well as determine whether a particular group (e.g., a group of content creators, items, or users) are advantaged or disadvantaged by biases introduced into the recommendation system. The biases may be a result of large quantities of unlabeled user-item pairs for each user receiving recommendations. Thus, the recommendations may be based on a small set of labeled user-item pairs in the user's history, which may not be fully representative of the content of interest to the user. Furthermore, the recommendation bias can be amplified by continuing to recommend similar items to the labeled items indicating user interest. This bias may be reflected both in the lack of exposure by content creators and items, as well as in the consumed items by end users. For example, in a social media platform, the content creators may be users of the platform that create and upload content to the platform (e.g., video content), while the consumers are users of the platform who receive recommended video content.

Different metrics can be used to evaluate the fairness of recommendation systems including Ranking-based Statistical Parity (RSP) and Ranking-based Equal Opportunity (REO). While this description focuses on REO, similar techniques can be used in the context of other types of fairness metrics.

The system accounts for the influence of user-item pairs without labels by evaluating a portion of random traffic data to estimate user interest. In some implementations, biases in the recommendation system can be corrected based on the evaluation.

For a given dataset of user-item pairs evaluated by the recommendation system, in other words a dataset in which a recommendation decision has been made for an item with respect to a user, a set of sensitive attributes can be used to partition the entire set of user-item pairs into distinct groups. Sensitive attributes are some attributes of either the user or the item that are of interest in the fairness evaluation. For example, gender can be chosen as a sensitive attribute. The sensitive attributes are usually derived from the information encoded in the user-item pair or some proxy derived from machine learning models.

The REO fairness measures the disparity of positive utility between the different groups. In particular, the system can calculate a ranking-based true positive rate (RTPR) utility for each group, which can then be used to determine an REO fairness penalty ($\Delta_{REO}$), which is defined according to a relation of the standard deviation of the group RTPR utilities and the mean of the RTPR utilities.

However, when missing label data is not taken into account, accurate REO metrics may not be determinable. For example, two datasets representing two different groups may have an ΔREO of zero indicating perfect fairness based on the labeled data; while one of the datasets in reality is not perfectly fair. In other words, the two groups completely agree on the recommendations of the items to users in the two groups. However, without information on the unlabeled data, the actual fairness measurement may be different between the two groups. For example, users of one group may be missing out on recommended content of interest that is not reflected by the outcomes of the recommendation system.

To capture this missing information, the system can collect a subset of random traffic data. The random traffic data reflects a random selection of the candidate pool to recommend along with the "default traffic" corresponding to recommendations of the recommendation system at the time of a user request. The additional data resulting from forced insertion of random item recommendations to the recommendations generated through a default recommendation strategy of the recommendation system can then be used to calculate one or more fairness metrics.

In particular, the respective group RTPR utilities can be calculated using data from the default traffic recommendation and the random recommendations. The fairness can then be evaluated by calculating ΔREO from the calculated RTPR group utilities.

Duplication of random traffic items can also be accounted for. For example, if an item is recommended by both the default traffic and the random traffic, the item is only delivered once, but the resulting data for the user-item pair can be associated with both traffic sources. In another example, if an item previously recommended by the default traffic is recommended to the user by the random traffic in response to a later request, the item is not recommended again, but the data from the earlier recommendation is added to the random traffic data.

Figure 9:
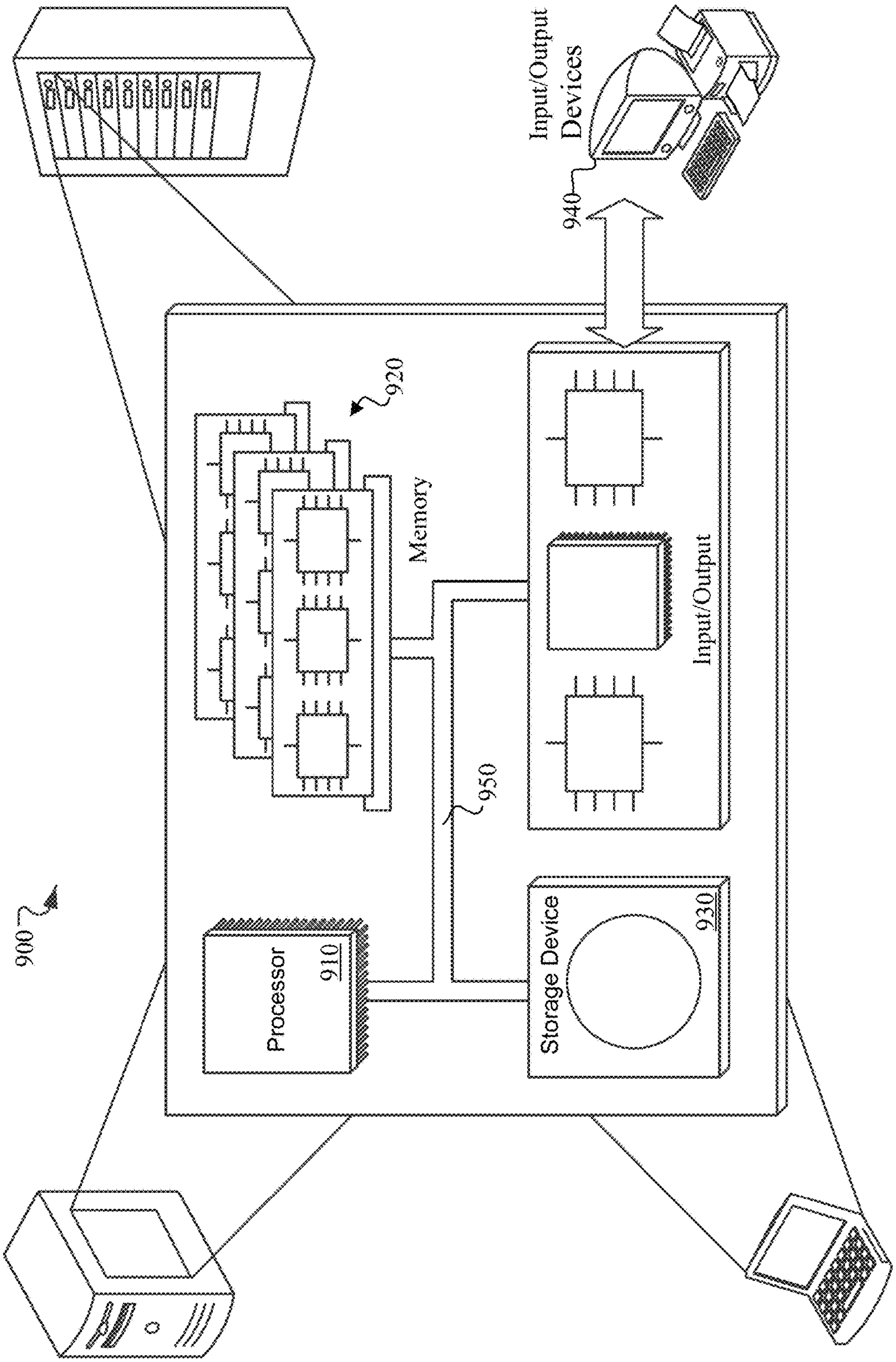
FIG. 9 is a schematic illustration of example computer systems that can be used to execute implementations of the present disclosure.

FIG. 1 illustrates an example process 100 of estimating fairness metrics of a recommendation system using random traffic. For convenience, process 800 will be described as being performed by a computer system. An example computer system can be a computer system 900, as illustrated in FIG. 9.

At 102, a computer system generates random traffic of recommendation decisions in a recommendation system. In some implementations, records in the recommendation system are user-item pairs with M user requests $\mathcal{U}:=\{u_1, u_2, \ldots, u_M\}$ and N items $\mathcal{I}:=\{i_1, i_2, \ldots, i_N\}$. Some user requests may correspond to the same user. Data set $\mathcal{D}$ consists of M×N rows. Each row of data set $\mathcal{D}$ corresponds to a user-item pair $(u_m,i_n)$ and can be represented by $(u_m,i_n,R(u_m,i_n),Y(u_m,i_n),S(u_m,i_n))$, where $R(u_m,i_n)\in\{0,1\}$ (i.e., $R(u_m,i_n)$ has a value of 0 or 1) and indicates the actual recommendation decision made by the recommendation system (also referred to as the default traffic). $R(u_m,i_n)=1$ indicates that in is recommended to the request $u_m$, and $R(u_m,i_n)=0$ indicates that $i_n$ is not recommended to the request $u_m$. $Y(u_m,i_n)\in\{0,1\}$ indicates the actual preference label (also referred to as relevance label). $Y(u_m,i_n)=1$ indicates that $i_n$ is relevant to the request $u_m$, and $Y(u_m,i_n)=0$ indicates that $i_n$ is not relevant to the request $u_m$. $S(u_m,i_n)\in\mathcal{S}$ denotes the sensitive attribute of the user-item pair $(u_m,i_n)$ and $\mathcal{S}=\{s_1, \ldots, s_K\}$ is the set of sensitive attributes (i. e., $K:=|\mathcal{S}|$). In some cases, the sensitive attributes partition the set of user-item pairs into disjoint groups, and group k is the group of user-item pairs with sensitive attribute $s_k$, where $k=1, \ldots, K$.

In some implementations, ranking-based equal opportunity (REO) fairness represents an item-side fairness notion (also referred to as a creator-side fairness notion), namely $S(u_m,i_n)=S(i_n)$, where the user-dependency $u_m$ is dropped. In some cases, data set $\mathcal{D}$ represent random variables defined on a space consisting of user-item pairs. The space does not necessitate the dropping of user-dependency or item-dependency. For notational simplicity, the (u,i) dependency can be hidden in the random variables represented by data set $\mathcal{D}$, and the random variables can be denoted as (u,i,R,Y,S).

In some implementations, the REO fairness measures the disparity of ranking-based true positive rate (RTPR) utilities between groups of user-item pairs. The ranking-based true positive rate utility of group k ($U_k$) can be defined as:

$$U_k := \mathbb{P}(R=1 \mid Y=1, S=s_k), \tag{1}$$

where $U_k$ represents the probability that a user gets a recommended item created by creators from the k-th group of user-item pairs, when the user has a positive preference for the recommended item. In some cases, REO represents a derivative of the equal opportunity (EO) fairness notion that fits a ranking setting, where R=1 represents a positive prediction that the user gets the recommended item. The REO fairness penalty is defined as:

$$\Delta_{REO} := \frac{std(U_1, \ldots, U_K)}{\text{mean}(U_1, \ldots, U_K)}, \tag{2}$$

where the fairness penalty $\Delta_{REO}$ is a global fairness measurement, std( ) stands for a standard deviation function, and mean( ) stands for a mean function. In some cases, $\Delta_{REO}$ may not indicate which user-item group is advantaged or disadvantaged. Therefore, for a given user-item group, the relative group utility is defined as:

$$\Delta U_k := \frac{U_k}{\text{mean}(U_1, \ldots, U_k)} - 1, \tag{3}$$

where $\Delta U_k$ represents a deviation of the user-item group's utility to the mean value. The sign of $\Delta U_k$ represents the advantage or the disadvantage of the user-item group. In some cases, group utilities, relative group utilities, and fairness penalty are referred to as REO fairness metrics of the recommendation system.

Some notations used in the disclosure are described in Table 1 below.

TABLE 1

| Notation | Description |
|---|---|
| $u_m$ | The m-th user request |
| $i_n$ | The n-th item |
| $R(u_m, i_n)$ | The indicator of whether the default traffic recommended $i_n$ to request $u_m$ |
| $Y(u_m, i_n)$ | The indicator of user's preference on item $i_n$ for the user corresponding to request $u_m$ |
| $S(u_m, i_n)$ | The sensitive attribute of user-item (request-item) pair $(u_m, i_n)$ |
| $\mathcal{S} = \{s_1, \ldots, s_K\}$ | The set of sensitive attributes |
| $s_k$ | The k-th sensitive attribute value |
| $\mathcal{R}_m$ | The set of recommended items given user request $u_m$ |
| $\mathcal{U}_{rand}, \mathcal{I}_{rand}, \mathcal{D}_{rand}$ | The set of user request, items and user-item pairs in the random traffic. |
| $\dot{\sim}$ | Approximately distribute as. |
| $\overset{a}{\sim}$ | Asymptotically distribute as. |

TABLE 1-continued

| Notation | Description |
|---|---|
| $\lVert U \rVert_1$ | The 1-norm of the utility vector, which is equal to the sum of utilities $\lVert U \rVert_1 = \sum_{j=1}^{K} U_j$. |
| $\lVert\cdot\rVert_1, \lVert\cdot\rVert_2, \lVert\cdot\rVert_F$ | These notations stand for 1-norm, 2-norm and Frobenius norm respectively. |
| $p_k$ | $p_k := P(Y(u, i) = 1, S(i) = s_k)$, the joint probability of an item liked by u and the item from group k. |
| $q_k$ | $q_k := P(Y(u, i) = 1, S(i) = s_k \mid R(u, i) = 1)$, the joint probability of an item liked by u and the item from group k conditioned on that i is recommended to u. |
| $\hat{P}_k$ | The estimator of $p_k$. |
| $\hat{Q}_k$ | The estimator of $q_k$. |
| $U_k$ | The utility (Ranking-based true positive rate) of group k. |
| $\hat{U}_k$ | The estimated utility of group k. |
| $\Delta U_k$ | The relative utility of group k. |
| $\widehat{\Delta U}_k$ | The estimated relative utility of group k. |
| $\Delta_{REO}$ | The fairness penalty. |
| $\widehat{\Delta_{REO}}$ | The estimated fairness penalty. |

In some implementations, the full set of user-item pairs can be partitioned into two subsets, one containing pairs that are recommended (i.e., R=1, recommended subset) and the other with pairs that are not recommended (i.e., R=0, unrecommended subset). In the recommended subset, users' engagement actions (e.g., like, share, etc.) on items can reflect their preference labels Y on the items. In contrast, those labels of user-item pairs in the unrecommended subset are unknown. Due to the unknown (also referred to as missing) labels in the unrecommended subset, REO metrics may not be identifiable from a partially observed subset without probing the unrecommended subset using random traffic of recommendation decisions.

For example, two datasets A and B are derived in a recommendation system that contains two sensitive attributes $s_1$ and $s_2$. Aggregating the user-item pair count according to recommendation decisions and preference labels, the two datasets can be represented by Table 2 below.

TABLE 2

| | dataset A | | dataset B | |
|---|---|---|---|---|
| | Y = 0 | Y = 1 | Y = 0 | Y = 1 |
| R = 0 | 100,000/100,000 | 0/0 | 99,900/100,000 | 100/0 |
| R = 1 | 0/0 | 100/100 | 0/0 | 100/100 |

Table 2 includes an example that shows the unidentifiability of a REO metric due to missing labels. The first number before the slash in each entry represents the value of attribute $s_1$ and the second number after the slash represents the value of attribute $s_2$, (e.g., 100/0 means 100 pairs in group 1 and 0 pair in group 2).

For dataset A, $U_1 = \mathbb{P}(R=1 \mid Y=1, S=s_1)=100/100=1$ and $U_2 = \mathbb{P}(R=1 \mid Y=1, S=s_2)=100/100=1$. Therefore, the dataset is completely fair as $\Delta_{REO}=0$. However, for dataset B, $U_1=100/(100+100)=0.5$ and $U_2=100/100=1$. Consequently, $\Delta_{REO}=⅔$. The two datasets completely agree on the recommended subset where R=1. Therefore, without any information from the unrecommended subset that has R=0, the two datasets are not distinguishable even though they have different fairness values.

Therefore, in some cases, there exists a completely fair ($\Delta_{REO}=0$) set of user-item pairs dataset and an unfair ($\Delta_{REO}>0$) set of user-item pairs such that they agree on the recommended subset.

In some cases, REO metrics may not be identifiable because there exist two datasets that agree on the recommended subset. However, the REO metrics of the two datasets cannot be computed to sufficient accuracy. Conversely, in some cases, a quantity is identifiable if there exists a method such that for any input dataset of a fixed size, the method can estimate the quantity with uniformly small estimation error and with high probability.

In some implementations, REO metrics may not be identifiable without probing an unrecommended subset. In some cases, REO metrics can be determined by probing and storing information inside the unrecommended subset. Probing the unrecommended subset can also be referred to as random traffic, which is a sampling procedure, for example, a uniform sampling procedure, on user-item pairs. In some cases, a weighted (also referred to as nonuniform) sampling procedure may be used to probe the unrecommended subset. However, using a nonuniform sampling procedure may introduce biases in the computation of REO fairness metrics.

In some implementations, random traffic is independent of the default traffic.

Figure 2:
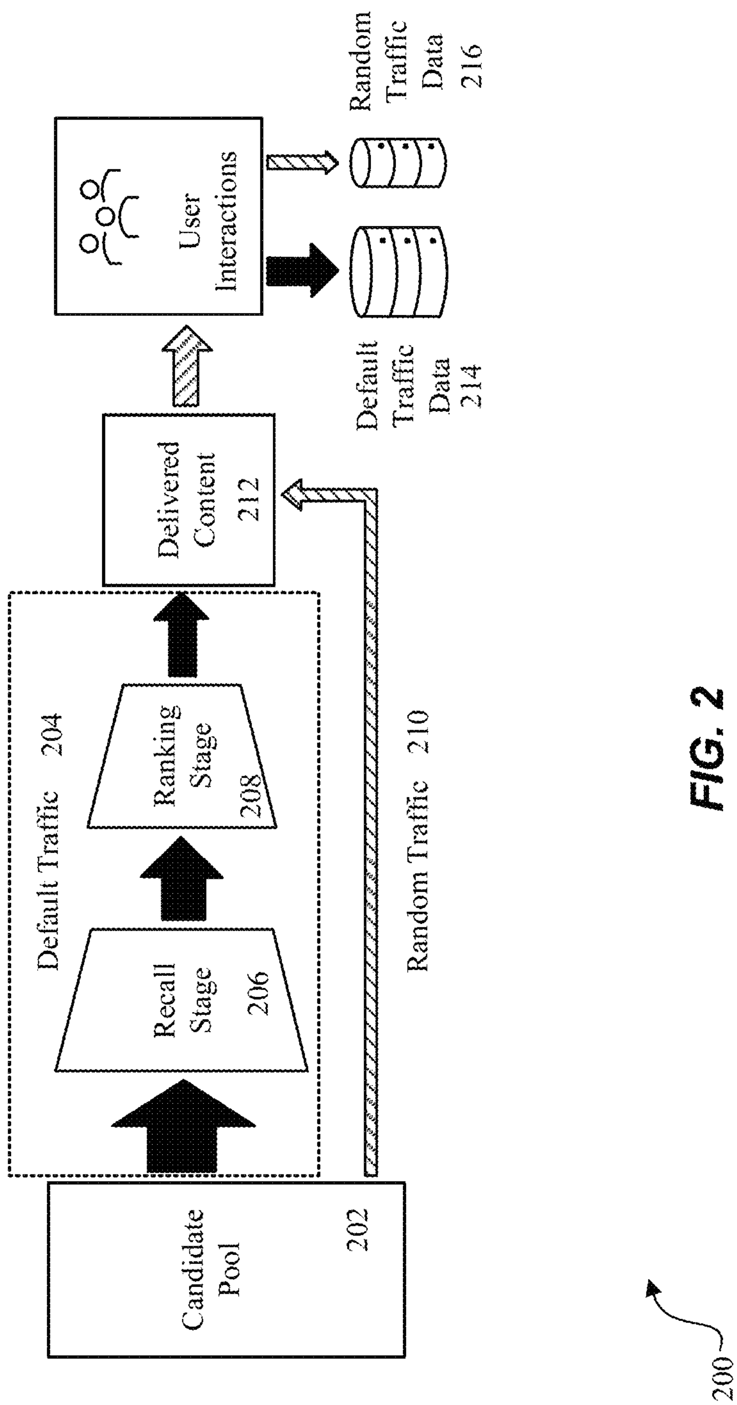
FIG. 2 illustrates an example of default traffic and random traffic in a recommendation system.

FIG. 2 illustrates an example of default traffic 204 and random traffic 210 in a recommendation system 200. In some implementations, recommendation system 200 can be implemented using a computer system, for example, computer system 900 in FIG. 9.

In some implementations, candidate pool 202 includes multiple items in recommendation system 200. In some implementations, to generate random traffic 210, recommendation system 200 first determines whether to activate random sampling for every incoming user request, where the activation can follow a probability distribution, for example, a Bernoulli distribution, with an activation probability of $p_{act}>0$. In some cases, the activation probability can be a sufficiently small number (e.g., $p_{act}<10^{-3}$).

Figure 3:
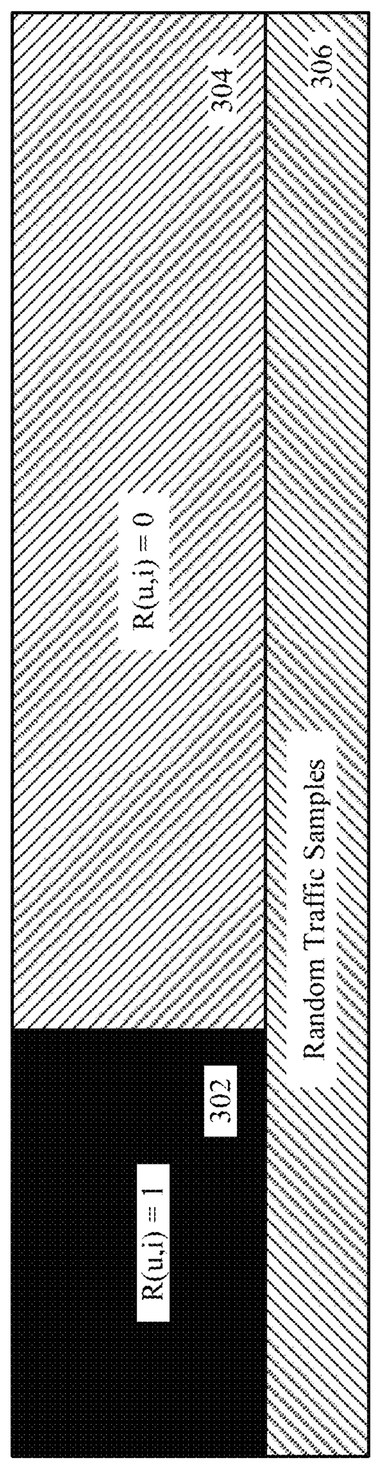
FIG. 3 illustrates an example logic for random sampling when generating random traffic.

FIG. 3 illustrates an example logic 300 for random sampling when generating random traffic 210. R(u,i)=1 (i.e., 302 in FIG. 3) indicates that i is recommended in default traffic 204 for a user request u. R(u,i)=0 (i.e., 304 in FIG. 3) indicates that i is not recommended in default traffic 204 for a user request u. In some implementations, if random sampling is not activated for an incoming user request, the user request can receive recommendations of items from default traffic 204. On the other hand, if random sampling is activated for a request, recommendation system 200 can uniformly at random choose items (i.e., random traffic samples 306 in FIG. 3) from candidate pool 202 to recommend. In some cases, default traffic 204 includes recall stage 206 and ranking stage 208, and delivered content 212 includes recommended items.

In some implementations, random traffic 210 may recommend the same candidates as those recommended by default traffic 204. A de-duplication process can be performed by the recommendation system to remove the duplicated recommendations. For example, during online serving, the traffic source of each delivered item can be marked, and when random traffic 210 and default traffic 204 both recommend an item to the user, the item is only kept once. However, the corresponding user-item pair's data is saved to both $\mathcal{D}_{rec}$ and $\mathcal{D}_{rand}$, e.g., if item i is previously recommended in default traffic 204 and is recommended to user u by random traffic 210 later, item i is not recommended to user u again. However, the data corresponding to user-item pair (u,i) is saved to $\mathcal{D}_{rand}$.

In some implementations, the sets of user requests, items, and user-item pairs in default traffic 204 can be represented by $\mathcal{U}_{rec}$, $\mathcal{I}_{rec}$, and $\mathcal{D}_{rec}$ respectively and be part of default traffic data 214, and the sets of user requests, items, and user-item pairs in random traffic 210 can be represented by $\mathcal{U}_{rand}$, $\mathcal{I}_{rand}$, and $\mathcal{D}_{rand}$ respectively and be part of random traffic data 216. In some cases, recommendation system 200 can maintain log data for user-item pairs that are recommended to the users. In some cases, the full daily log data may contain a very large amount of user-item information (e.g., $>10^8$ rows per day), and recommendation system 200 may sample uniformly at random from the user-item pairs and save them to the log data to reduce the computational and/or memory cost. In some cases, user-item pairs in $\mathcal{D}_{rec}$ can be sampled uniformly at random from user-item pairs in $\mathcal{D}$ such that R(u,i)=1. In some cases, while $\mathcal{D}_{rec}$ is stored in recommendation system 200, $\mathcal{D}_{rand}$ is only available when random traffic 210 is implemented in recommendation system 200.

Returning to FIG. 1, at 104, the computer system determines REO fairness metrics of the recommendation system, for example, recommendation system 200. In some implementations, the definition of the group utility in Equation 1 involves counterfactual events as the users' preference label is identified after the users receive the recommended items. This causality renders the direct evaluation of the group utility infeasible in accordance with the identifiability of REO fairness metrics. To determine REO fairness metrics, the computer system can factor the group utility into measurable components by leveraging default traffic and random traffic. Using the Bayesian theorem, the group utility can be represented as $$U_k = \mathbb{P}(R=1 \mid Y=1, S=s_k) = \frac{\mathbb{P}(Y=1, S=s_k \mid R=1)}{\mathbb{P}(Y=1, S=s_k)}\mathbb{P}(R=1). \tag{4}$$

Therefore, the group utility can be represented using the three probabilities in Equation 4 above, and each of the three probabilities is either measurable or irrelevant. From the random traffic and default traffic, the following quantities can be determined as:

$$\hat{P}_k := \frac{\sum_{(u,i)\in\mathcal{D}_{rand}} [\![(Y(u,i)=1)]\!](S(i)=s_k)}{|\mathcal{D}_{rand}|}, \tag{5}$$

$$\hat{Q}_k := \frac{\sum_{(u,i)\in\mathcal{D}_{rec}} [\![(Y(u,i)=1)]\!](S(i)=s_k)}{|\mathcal{D}_{rec}|}. \tag{6}$$

In some implementations, $p_k:=P(Y=1,S=s_k)$ measures the proportion of "preferred samples" from group k in the entire candidate pool, while $q_k:=P(Y=1, S=s_k \mid R=1)$ measures the proportion of "preferred samples" from group k in the recommended candidates. Therefore, $\hat{P}_k$ and $\hat{Q}_k$ represent noisy estimators of $p_k$ and $q_k$ from $\mathcal{D}_{rand}$ and $\mathcal{D}_{rec}$.

Consequently, REO fairness metrics can be determined as follows:

$$\hat{U}_k := \frac{\hat{Q}_k}{\hat{P}_k}, \tag{7}$$

-continued $$\widehat{\Delta U_k} := \frac{\hat{U}_k}{\text{mean}(\hat{U}_1, \ldots, \hat{U}_K)} - 1, \quad (8)$$

$$\widehat{\Delta_{REO}} := \frac{std(\hat{U}_1, \ldots, \hat{U}_K)}{\text{mean}(\hat{U}_1, \ldots, \hat{U}_K)}. \quad (9)$$

In some implementations, the estimator $\hat{U}_k$ is equal to a utility function up to a scalar $\mathbb{P}(R=1)$, and the scalar is independent of the group index (k). The relative group utility $\widehat{\Delta U_k}$ and the fairness penalty $\widehat{\Delta_{REO}}$ are invariant under the simultaneous rescaling of utility functions. Therefore, the rescaling scalar $\mathbb{P}(R=1)$ does not affect the estimation of a fairness metric of interest. In some cases, the rescaling scalar $\mathbb{P}(R=1)$ represents the probability that a random user-item pair goes through a recommendation process. Due to the large size of the possible user-item pairs and the large volume of the recommendation log, determining the rescaling scalar $\mathbb{P}(R=1)$ may be time-consuming. However, the Bayesian theorem enables the estimator $\hat{U}_k$ to be factored into two measurable quantities $\hat{Q}_k$ and $\hat{P}_k$ using default traffic and random traffic, as shown in Equations 5 to 7, without determining the rescaling scalar $\mathbb{P}(R=1)$.

In some implementations, if the traffic sizes are sufficiently large such that $|\mathcal{D}_{rec}|$ and $|\mathcal{D}_{rand}|$ have computational complexity on the order of $O(K^2\epsilon^{-2}\log(K\delta^{-1}))$, then with a probability of at least $1-\delta$, the estimation errors of the relative group utility $\widehat{\Delta U_k}$ and the fairness penalty $\widehat{\Delta_{REO}}$ are uniformly upper bounded as follows:

$$\max_{k=1,\cdots,K} |\widehat{\Delta U_k} - \Delta U_k| \le \epsilon \text{ and } |\widehat{\Delta_{REO}} - \Delta_{REO}| \le \epsilon. \quad (10)$$

In some implementations, $\hat{P}_k$ and $\hat{Q}_k$ are unbiased estimators of $p_k$ and $q_k$ respectively. In some cases, the random traffic size $$|\mathcal{D}_{rand}| = O(p_k^{-1}\epsilon^{-2}\log(\delta^{-1}))$$

and the default traffic size $$|\mathcal{D}_{rec}| = O(q_k^{-1}\epsilon^{-2}\log(\delta^{-1})),$$

and both estimators $\hat{P}_k$ and $\hat{Q}_k$ are $\epsilon$-close to the exact values of $p_k$ and $q_k$ respectively in relative errors, with probabilities of at least $1-\delta$.

In some implementations, the estimator $\hat{U}_k$ is a consistent estimator of the RTPR utility. In some cases, when the sample size parameter is $$n = O(\epsilon^{-2}\log(\delta^{-1})),$$

the estimator $\hat{U}_k$ (up to a multiplicative constant) is $\epsilon$-close to the RTPR utility with a probability at least $1-\delta$.

In some implementations, to estimate relative group utilities and fairness penalty simultaneously, the sample size parameter can be set as $$n = O(K^2\|U\|_1^{-2}\epsilon^{-2}\log(K\delta^{-1})).$$

In some cases, when $p_k$ and $q_k$ are consistently large, the size of default traffic can be set to $$O(K^2\epsilon^{-2}\log(K/\delta)).$$

Similarly, the size of random traffic can be set to $$O(K^2\epsilon^{-2}\log(K/\delta)).$$

At 106, the computer system monitors the estimated REO fairness metrics of the recommendation system, for example, recommendation system 200. The monitoring process can include determining confidence intervals of the fairness metrics estimated at 104, as well as performing significance tests for treatment effects in A/B tests of recommendation strategies. An A/B test is a user experience testing method that compares two or more versions of a variable to determine which one performs best. In some implementations, an A/B test can be used to test if an alternative strategy is superior to the current strategy, e.g., replacing a recommendation model with a different one.

FIG. 4 illustrates an example 400 of an algorithm for determining confidence intervals of estimators of fairness metrics. In some implementations, $p_k$ and $q_k$ can be estimated from sample means that are asymptotically normal distributed following central limit theorem. Therefore, the fairness metrics can also admit a similar asymptotic normality. Consequently, the variance of fairness metrics can be determined by propagating the variance of sources $P_k$ and $P_q$. Therefore, confidence intervals of estimators of fairness metrics can be determined using Algorithm 1 in FIG. 4, leveraging the statistical distribution of REO metrics. Algorithm 1 is based on Equations 5 to 9 and uses the same notations as those used in Equations 5 to 9.

FIG. 5 illustrates an example 500 of an algorithm for partition-based A/B tests for REO fairness metrics. In some implementations, the denominators of RTPR utilities in both the control and treatment groups can be derived from the same dataset $\mathcal{D}_{rand}$, which may introduce unwanted correlations between estimators from the two groups. However, in some cases, the denominator of the RTPR utilities is increasingly close to a scalar constant when the size of the dataset $|\mathcal{D}_{rand}|$ becomes large, as suggested by the law of large numbers. Therefore, estimators $$\hat{U}_k^C \text{ and } \hat{U}_k^T$$

from the control and treatment groups can be weakly correlated in the large sample limit in terms of $|\mathcal{D}_{rand}|$. Consequently, in large sample size regime, the correlation between estimators from the two groups can be treated as a high-order perturbation. Thus, the hypothesis testing in the A/B test can fit the framework of two normal-distributed sample tests.

In some implementations, datasets queried from a database can be of large scales. Therefore, partitioning a full dataset into a collection of non-overlapped subsets can be used to retrieve more statistical information. For example, given a dataset $(\mathcal{D}_{rec}, \mathcal{D}_{rand})$, a M-fold partition gives a collection of subsets $\{(\mathcal{D}_{rec}(j), \mathcal{D}_{rand}(j)): j \in [M]\}$. Computing REO metric on each subset leads to $\{\widehat{\Delta_{REO}}(j): j \in [M]\}$, which are independent and identically distributed (i.i.d.) normal distributions. In some cases, the sample size of the control group may differ than that of treatment group, the partition fold number may also differ between the two groups. In some cases, the partition fold numbers of dataset from control and treatment groups can be denoted as $M_C$ and $M_T$. The mean and standard deviation of subset REO metrics from each group are $\mu_C$:=mean $(\widehat{\Delta^C_{REO}}(\cdot))$ and $s_C$:=std $(\widehat{\Delta^C_{REO}}(\cdot))$, and $\mu_T, s_T$ can be defined similarly. Therefore, the pivot statistic follows student t-distribution, according to Welch's t-test:

$$T := \frac{D_{REO} - (\mu_T - \mu_C)}{\sqrt{s_T^2 / M_T + s_C^2 / M_C}} \sim t_v, \quad \text{where } v \approx \left\lfloor \frac{\left(\frac{s_T^2}{M_T} + \frac{s_C^2}{M_C}\right)^2}{\frac{s_T^4}{(M_T^2(M_T-1))} + \frac{s_C^4}{(M_C^2(M_C-1))}} \right\rfloor. \tag{11}$$

Inverting this pivot distribution gives the confidence interval:

$$\mu_T - \mu_C - t_v\left(\frac{\delta}{2}\right)\sqrt{\frac{s_T^2}{M_T} + \frac{s_C^2}{M_C}} \le D_{REO} \le \mu_T - \mu_C + t_v\left(\frac{\delta}{2}\right)\sqrt{\frac{s_T^2}{M_T} + \frac{s_C^2}{M_C}}, \tag{12}$$

where $1-\delta$ is confidence level. This A/B test procedure can be performed using Algorithm 2 in FIG. 5.

FIG. 6 illustrates an example 600 of an algorithm for bootstrap-based A/B tests for REO fairness metrics. In some implementations, when the size of a dataset is relatively small, partitioning may weaken the representation ability of the statistical information of the dataset. In some cases, confidence interval can be constructed by estimating the variance of the difference-in-REO metric using bootstrap. For example, given a dataset $$(\mathcal{D}^T_{rec}, \mathcal{D}^C_{rec}, \mathcal{D}_{rand}),$$

a bootstrap procedure can generate a collection of datasets $$\{(\mathcal{D}^T_{rec}(j), \mathcal{D}^C_{rec}(j), \mathcal{D}_{rand}(j)): j \in [B]\}$$

of the same size, by sampling the original dataset with replacement. Computing difference-in-REO on each bootstrap dataset, a collection of bootstrap metrics $\{\widehat{D_{REO}}(j): j \in [B]\}$ can be derived. Then, the standard error of difference-in-REO can be approximated by the standard deviation of bootstrap metrics, i.e., se$(\widehat{D_{REO}}) \approx$ std$(\widehat{D_{REO}}(\cdot))$. In some cases, $\widehat{D_{REO}}$ is the difference-in-REO metric computed on the original dataset. Therefore, the confidence interval is:

$$\widehat{D_{REO}} - z\left(\frac{\delta}{2}\right)se(\widehat{D_{REO}}) \le D_{REO} \le \widehat{D_{REO}} + z\left(\frac{\delta}{2}\right)se(\widehat{D_{REO}}) \tag{13}$$

where $1-\delta$ is the confidence level and $z(\delta/2)$ is the quantile of standard normal distribution. This A/B test procedure can be performed using Algorithm 3 in FIG. 6.

FIG. 7 illustrates an example 700 of an algorithm for significance tests for treatment effects in A/B tests. In some implementations, a recommendation strategy can correspond to a system configuration, for example, models, filtering rules, boosting rules, and/or user interface (UI) design.

In some implementations, A/B tests can concurrently occur on a platform with a large number of distinct configurations. A recommendation strategy can be a high-level concept, which can be a combination of multiple fine-grained strategies. For example, a recommendation system can contain two configuration dimensions, one for models and the other one for UI design. Therefore, the most fine-grained configuration can contain the Cartesian product of (use model A, use model B)×(use UI C, use UI D), corresponding to 4 most fine-grained recommendation strategies. However, the recommendation strategies can also be higher-level concepts, for example, "use model A" vs "use model B," while in each strategy the UI design distribution is the same.

In some implementations, fairness metrics' statistical significance can be used to build responsible and sustainable recommendation platforms. The fairness metrics' statistical significance can be used to determine (1) if a new recommendation strategy may significantly worsen system fairness, (2) if fairness enhancing strategies can have significant effects, or (3) if new strategies are blocked by false positive fairness alarms.

In some implementations, results in A/B testing cases can be shown with a number of experiment groups, for example, a control group and a treatment group. In some cases, the utilities in the control and treatment group can be denoted as $$U^C_k, U^T_k, \hat{U}^C_k, \hat{U}^T_k,$$

which are measured on $$\mathcal{D}^T_{rec}, \mathcal{D}^C_{rec},$$

with a common $\mathcal{D}_{rand}$.

In some implementations, to determine if a treatment strategy has a statistically significant REO fairness metric change, two metrics can be used.

First, for group index k=1, . . . , K, $\widehat{D_k} := \widehat{\Delta U^T_k} - \widehat{\Delta U^C_k}$ can measure the difference between the control group and the treatment group. In some cases, monitoring $\widehat{D_k}$ can ensure that disadvantaged groups in the control group will not be further disadvantaged in the treatment group.

Second, $\widehat{D_{\text{REO}}} := \widehat{\Delta^{T}_{\text{REO}}} - \widehat{\Delta^{C}_{\text{REO}}}$ can measure the change in the global fairness penalty between the control group and the treatment group. In some cases, monitoring $\widehat{D_{\text{REO}}}$ can ensure that the global fairness penalty does not grow significantly in the treatment group.

In some implementations, the fairness metrics in the control and treatment groups in the A/B test data can share a common random traffic $\mathcal{D}_{rand}$. In some cases, sharing the common random traffic $\mathcal{D}_{rand}$ may introduce unwanted correlations between estimators from the two groups. However, in some cases, $\hat{P}_k$ can be increasingly close to a scalar constant $p_k$, when the size of the random traffic $|\mathcal{D}_{rand}|$ is large enough, according to the law of large numbers. Therefore, the correlation between fairness metric estimators from the control and treatment groups can be weak in the large sample limit in terms of $|\mathcal{D}_{rand}|$. In some implementations, using the testing method in Algorithm 1, the significance tests of fairness metrics in A/B tests can be established similarly.

In some implementations, treatment effect in A/B tests (i.e., the difference between the means of the two strategies being tested) can be quantified as the difference in fairness metrics, for example, $$D_{REO} = \Delta_{REO}^{treatment} - \Delta_{REO}^{control}.$$

In some implementations, significance tests for treatment effects in A/B tests can be performed using Algorithm 4 in FIG. 7. The significance tests can enable the deployment of random traffic based fairness monitoring and benchmarking framework in large-scale commercial platforms, based on Equations 5 to 9.

In some implementations, a design parameter in measuring and monitoring fairness metrics is the volume/fraction of random traffic. In some cases, random traffic may ignore the user's preference, and therefore a high volume of random traffic may not expose users sufficiently to their interests and may negatively affect the user experience.

In some implementations, a tradeoff between recommendation relevance and measurement accuracy can be achieved. In some cases, a platform can benefit from both a high recommendation relevance and high accuracy of fairness metric measurements, and therefore the platform's utility function can be represented as $$U_{platform} := (1-\gamma)U_{rel} + \gamma U_{acc}(\epsilon, \delta), \tag{28}$$

where $$U_{rel} := \beta U_{rel}^{T} + \beta U_{rel}^{C} + \alpha U_{rel}^{rand}$$

measures the recommendation relevance utility component, and β, α denote the treatment/control group volume and random traffic volume in this A/B test respectively. In some cases, $U_{acc}(\epsilon,\delta)$ can be determined by ε and δ in Equation 10, and $\gamma \in (0,1)$ can measure the relative importance of recommendation relevance and measurement accuracy. In some cases, $$U_{rel}^{rand} < \min\{U_{rel}^{T}, U_{rel}^{C}\}$$

and thus increasing α can decrease $U_{rel}$. In some cases, $U_{acc}$ increases in α can lead to the system collecting sufficiently large $\mathcal{D}_{rand}$ more quickly for given values of ε and δ, therefore achieving the tradeoff.

In some implementations, orthogonal traffic assignment can be applied on the same set of users. One aspect of orthogonal traffic assignment is that the same random traffic can be used to measure the REO-related metrics for all experiments running on the users. Therefore, further sacrificing recommendation relevance can be avoided.

In some implementations, to achieve an estimation accuracy $U_{acc}(\epsilon,\delta)$, the sample size depends on $p_k$ and $q_k$ values, where the $q_k$ values can depend on the implemented treatment and control strategies and influence the sample size. In some cases, although a system can set different random traffic volumes on different sets of users, A/B tests with orthogonal traffic assignment on the same set of users can share the same random traffic volume, and the system can choose different time window lengths to get the respective data sizes for the A/B tests.

In some implementations, a small volume of random traffic can be beneficial for a recommendation platform both in terms of metrics estimation and user experience. In some cases, the $U_{rel}$ part may not necessarily be monotone in the fraction of default strategy, because recommendation models estimate users' preferences based on historical interactions and may not always characterize the users' preferences accurately, especially when certain types of items never appear in the users' history.

In some implementations, to diagnose if recall stage 206 in FIG. 2 is fair in terms of REO, a post-recall (or preranking) traffic can be inserted into delivered contents 212, and a set of user-item pairs (denoted $\mathcal{D}_{pr}$) can be generated from the post-recall. Then if the terms obtained from $\mathcal{D}_{rec}$ with $\mathcal{D}_{pr}$ in previous sections are replaced, the REO-related metrics of recall stage 206 can be estimated. Similarly, if the terms obtained from $\mathcal{D}_{rand}$ with $\mathcal{D}_{pr}$ in previous sections are replaced, the REO-related metrics of the ranking stage 208 can be estimated.

Use cases:

Recommendation systems can be used by various entities and to provide various types of recommendations. One use of a recommendation system is to recommend particular content items to users. For example, user devices for users of a social media platform can request delivery of content, e.g., video content. The platform can use a recommendation system executing one or more recommendation strategies to determine content recommendations to provide to the user device, for example, as a feed or stream of content items.

Within a strategy: A fairness of a recommendation strategy can be monitored. For example, a social media platform can include a recommendation system that implements one or more recommendation strategies for recommending content to users of the platform. For example, the social media platform can provide video content to users. The recommendation system can employ one or more strategies to identify, for example, video content likely to be of interest to each user and provide the identified videos to a user device. In addition to determining a ΔREO as a global fairness measurement of the recommendation system strategy, the platform can further determine whether a particular group of users or content items are advantaged or disadvantaged by the recommendation strategy. In some implementations, the fairness metric, e.g., ΔREO, can be compared to a threshold fairness value. If the threshold value is not satisfied by the recommendation strategy, the recommendation strategy can be updated to reduce the ΔREO.

Between strategies: The technologies described in this specification can be used to evaluate recommendation strategies for impact on fairness. For example, a new recommendation strategy may worsen fairness or enhance fairness. In the context of a social media platform, a new strategy may describe a proposed change to the recommender system that alters the recommended content items to provide to individual users of the platform. These strategies can undergo testing, e.g., AB testing, to evaluate the impact of the new strategy as compared to the current strategy. In addition to evaluating the performance of the strategy itself, the impacts on fairness can also be evaluated using the random traffic techniques described above.

Figure 8:
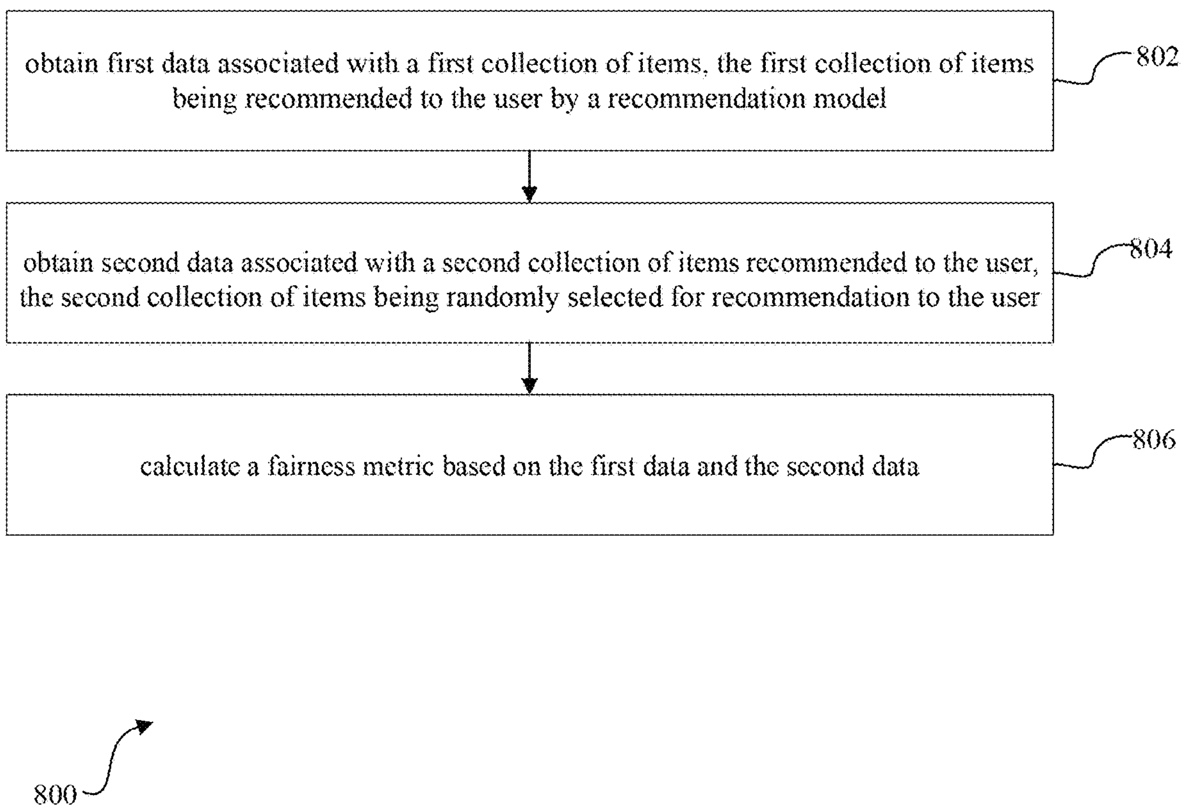
FIG. 8 illustrates an example process of estimating fairness metrics of a recommendation system.

FIG. 8 illustrates an example process 800 of estimating fairness metrics of a recommendation system. For convenience, process 800 will be described as being performed by a computer system. An example computer system is computer system 900 shown in FIG. 9.

At 802, a computer system obtains first data associated with a first collection of items, the first collection of items being recommended to the user by a recommendation model.

At 804, the computer system obtains second data associated with a second collection of items recommended to the user, the second collection of items being randomly selected for recommendation to the user.

At 806, the computer system calculates a fairness metric based on the first data and the second data.

FIG. 9 illustrates a schematic diagram of an example computer system 900. The system 900 can be used for the operations described in association with the implementations described herein. For example, the system 900 may be included in any or all of the server components discussed herein. The system 900 includes a processor 910, a memory 920, a storage device 930, and an input/output device 940. The components 910, 920, 930, and 940 are interconnected using a system bus 950. The processor 910 is capable of processing instructions for execution within the system 900. In some implementations, the processor 910 is a single-threaded processor. The processor 910 is a multi-threaded processor. The processor 910 is capable of processing instructions stored in the memory 920 or on the storage device 930 to display graphical information for a user interface on the input/output device 940.

The memory 920 stores information within the system 900. In some implementations, the memory 920 is a computer-readable medium. The memory 920 can be a volatile memory unit or a non-volatile memory unit. The storage device 930 is capable of providing mass storage for the system 900. The storage device 930 is a computer-readable medium. The storage device 930 may be a floppy disk device, a hard disk device, an optical disk device, or a tape device. The input/output device 940 provides input/output operations for the system 900. The input/output device 940 includes a keyboard and/or pointing device. The input/output device 940 includes a display unit for displaying graphical user interfaces.

The subject matter and the actions and operations described in this specification can be implemented in digital electronic circuitry, in tangibly embodied computer software or firmware, in computer hardware, including the structures disclosed in this specification and their structural equivalents, or in combinations of one or more of them. The subject matter and the actions and operations described in this specification can be implemented as or in one or more computer programs, e.g., one or more modules of computer program instructions, encoded on a computer program carrier, for execution by, or to control the operation of, data processing apparatus. The carrier can be a tangible non-transitory computer storage medium. Alternatively, or in addition to, the carrier can be an artificially generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed in any form, including as a stand-alone program, e.g., as an app, or as a module, component, engine, subroutine, or other unit suitable for executing in a computing environment, which environment may include one or more computers interconnected by a data communication network in one or more locations.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices.

To provide for interaction with a user, the subject matter described in this specification can be implemented on one or more computers having, or configured to communicate with, a display device, e.g., an LCD (liquid crystal display) monitor, or a virtual-reality (VR) or augmented-reality (AR)

display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech, or tactile feedback or responses; and input from the user can be received in any form, including acoustic, speech, tactile, or eye tracking input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this by itself should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for evaluating a fairness metric in a large-scale item recommendations system, comprising:

for a user of a plurality of users:

obtaining, by a computer system, first data associated with a first collection of items, the first collection of items being recommended to the user by a recommendation model from a candidate pool, wherein the candidate pool comprises items in the large-scale item recommendations system;

obtaining, by the computer system, second data associated with a second collection of items, the second collection of items being randomly selected from the candidate pool for recommendation to the user and comprising unlabeled user-item pairs;

determining, by the computer system as a calculated fairness metric, a fairness metric based on the first data and the second data, wherein determining the fairness metric based on the first data and the second data comprises:

partitioning user-item pairs in the first data and the second data into a plurality of groups;

determining a ranking-based true positive rate (RTPR) utility for each of the plurality of groups to determine a penalty corresponding to the fairness metric; and determining the fairness metric based on penalties determined from RTPR utilities that are determined for the plurality of groups; and determining, by the computer system, one or more recommendation strategies for the large-scale item recommendations system based on the calculated fairness metric.

2. The method of claim 1, wherein the first data comprises a first collection of user-item pairs and an associated label indicating a user's interest in a recommended item, and wherein the second data comprises a second collection of user-item pairs and an associated label indicating the user's interest in the second collection of items.

3. The method of claim 1, wherein the recommendation model employs one or more recommendation strategies that predict items of interest to the user.

4. The method of claim 1, wherein the first collection of items and the second collection of items are delivered to the user, and wherein the second collection of items are intermingled with the first collection of items for delivery to a user device.

5. The method of claim 1, wherein the first collection of items and the second collection of items are short-form videos, and wherein delivering the first and second collections of items to the user comprises providing at least a portion of video content of each item to a user device for including in a video feed.

6. The method of claim 1, wherein the fairness metric is a Ranking-based Equal Opportunity (REO) fairness penalty.

7. The method of claim 1, further comprising:

determining, by the computer system, a relative group utility to determine fairness differences between groups of users.

8. The method of claim 1, wherein the second collection of items represent unlabeled user-item pairs.

9. The method of claim 1, wherein in response to the first collection of items and the second collection of items containing a same recommended item, only a single version of the same recommended item is delivered to a user device, while data associated with a user-item pair is added to both the first data and the second data.

10. The method of claim 1, wherein a randomly selected item corresponds to an item that was recommended by the recommendation model in response to an earlier user request, and in response, not including the item for delivery to the user and adding data of a user-item pair from the earlier user request to the second collection of data.

11. The method of claim 1, wherein a fraction of total recommended items being randomly selected items is determined to balance a user's overall utility with an accuracy of the calculated fairness metric.

12. The method of claim 1, wherein the recommendation model is a machine learning model trained to generate predictions of video content of interest to a target user.

13. The method of claim 1, further comprising;

evaluating, by the computer system, differences in fairness metrics between the recommendation model and a second recommendation model, wherein the second recommendation model is based on one or more proposed recommendation strategies.

14. The method of claim 1, wherein the recommendation model is part of a social media platform, the plurality of users are associated with accounts on the social media platform, and the first collection of items and the second collection of items are generated by individual users and provided to the social media platform for distribution.

15. The method of claim 1, further comprising:

in response to the fairness metric indicating that fairness fails to satisfy a particular threshold value, modifying, by the computer system, one or more recommendation strategies.

16. A system comprising one or more computers and one or more storage devices storing instructions that are operable, when executed by the one or more computers, to cause the one or more computers to perform operations comprising:

for a user of a plurality of users:

obtaining, by a computer system, first data associated with a first collection of items, the first collection of items being recommended to the user by a recommendation model from a candidate pool, wherein the candidate pool comprises items in a large-scale item recommendations system;

obtaining, by the computer system, second data associated with a second collection of items, the second collection of items being randomly selected from the candidate pool for recommendation to the user and comprising unlabeled user-item pairs; and determining, by the computer system as a calculated fairness metric, a fairness metric based on the first data and the second data, wherein determining the fairness metric based on the first data and the second data comprises:

partitioning user-item pairs in the first data and the second data into a plurality of groups;

determining a ranking-based true positive rate (RTPR) utility for each of the plurality of groups to determine a penalty corresponding to the fairness metric; and determining the fairness metric based on penalties determined from RTPR utilities that are determined for the plurality of groups, determining, by the computer system, one or more recommendation strategies for the large-scale item recommendations system based on the calculated fairness metric.

17. A non-transitory computer-readable storage medium encoded with a computer program, the computer program comprising instructions that are operable, when executed by a data processing apparatus, to cause the data processing apparatus to perform operations comprising:

for a user of a plurality of users:

obtaining, by a computer system, first data associated with a first collection of items, the first collection of items being recommended to the user by a recommendation model from a candidate pool, wherein the candidate pool comprises items in a large-scale item recommendations system;

obtaining, by the computer system, second data associated with a second collection of items, the second collection of items being randomly selected from the candidate pool for recommendation to the user and comprising unlabeled user-item pairs; and determining, by the computer system as a calculated fairness metric, a fairness metric based on the first data and the second data, wherein determining the fairness metric based on the first data and the second data comprises:

partitioning user-item pairs in the first data and the second data into a plurality of groups;

determining a ranking-based true positive rate (RTPR) utility for each of the plurality of groups to determine a penalty corresponding to the fairness metric; and determining the fairness metric based on penalties determined from RTPR utilities that are determined for the plurality of groups, determining, by the computer system, one or more recommendation strategies for the large-scale item recommendations system based on the calculated fairness metric.

* * * * *